UNITED STATES PATENT OFFICE 2,133,732

MANUFACTURE OF HYDROCARBON POLYMERS

Hendrik Willem Huyser, Hilversum, and Johannes Andreas van Melsen, Amsterdam, Netherlands, assignors to Shell Development Company, San Francisco, Calif., a corporation of Delaware No Drawing. Application July 13, 1935, Serial No. 31,280. In the Netherlands April 28, 1930

5 Claims. (Cl. 260—683)

In our copending application, Serial No. 527,848, filed April 4, 1931, of which this is a continuation in part, there is described, using isobutylene as one typical example, a novel process for absorbing tertiary olefines in strong acids and for the production of tertiary alcohols and tertiary olefine polymers from the absorption products thus obtained. The claims of the original application are specific to the absorption and tertiary alcohol production steps of the invention, whereas the claims of the present application are restricted to the novel features of the process as applied to the manufacture of hydrocarbon polymers.

It is known to absorb olefines in strong acids and to convert the esters thus obtained into the corresponding alcohols by hydrolysis, or into polymers by heating. On chemical grounds it is to be expected that at most so many molecules of olefine will be capable of being bound by one molecule of acid as correspond to the basicity of the acid, whilst in general a sufficiently rapid reaction of the olefine with the acid takes place only as long as not more than one molecule of olefine is bound per molecule of acid.

Now, it has been found that, in so far as tertiary base olefines are concerned, more than one molecule of olefine per molecule of acid can be bound without the speed of reaction being reduced.

Consequently the process according to the invention is characterized by the absorption of more than one molecule of tertiary olefine or olefines per molecule of acid. Furthermore, it surprisingly appeared to be possible to absorb even more molecules of tertiary base olefines per molecule of acid than correspond to the basicity figure of the acid. Thus, for example, surfuric acid, after having already absorbed two molecules of isobutylene was effectively caused to take up a further quantity of isobutylene.

The acid liquors, or tertiary base olefine absorption products, obtained according to the invention are particularly suitable for the manufacture of hydrocarbon polymers. Most advantageously they may be worked up into polymers by heating under superatmospheric pressure, with or without previous dilution. The exact conditions which will be most preferable in any given case will depend upon the tertiary base olefine or olefines used and the degree of polymerization it is desired to effect. In general, conditions faving rapid formation and prompt removal of the desired polymer are most conducive to high yields.

For the purpose of making our invention more clear it will be described with more particular reference to the manufacture of isobutylene polymers, but it will be understood that we are not to be limited thereto, as our invention is capable of many widely different embodiments and may be used to produce the polymers of other tertiary base olefines such, for example, as iso-decanes from 2-methyl-1-butene and/or 2 methyl-2-butene, iso-dodecanes from tertiary hexalenes, and the like.

The temperature at which the polymerization is carried out does not markedly influence the composition of the final product in the range of about 80° C. to about 140° C. when the rate of decomposition of the acid liquor is high, although it has an indirect influence in so far as the rate of decomposition increases with the temperature and slow rates, i. e. low temperatures, favor the formation of higher polymers. At temperatures below about 80° C. decomposition of the tertiary base olefine absorption product is either slow (when the olefine concentration is low but acidity high) or largely in the direction of the re-formation of the mono-olefine when the olefine concentration is high and the acidity low, unless resort is had to very low temperatures, e. g. 35° C., when the solubility of the mono-olefine in the acid liquor is such that it is not given off and it is eventually polymerized. At 35° C. and below, the trimer is the principal product obtained from isobutylene acid liquors, for example. In general temperatures of about 100° C. are advantageous for the production of lower polymers as they may be conveniently maintained by means of boiling water baths and the like, and give rapid rates of acid liquor decomposition. At 100° C. decomposition is complete even with low acid strengths (e. g. sulfuric acid of about 40% on a hydrocarbon free basis) in a few minutes, say about ten minutes.

Slow reaction velocity, necessitating long time of contact, leads to a predominance of higher polymers in the product. Also excessive contact of the polymer formed with the residual acid especially when the acidity is high (sulfuric acid of over 65% concentration on a hydrocarbon free basis, for example) may cause the production of polymers of high sulfur content and inferior odor apparently as a result of some limited reaction between the polymer and the acid, particularly sulfuric acid.

Excessive dilution of the tertiary base olefine absorption product, that is very low acidity, favors reversion to the original monomer. But as the acidity is increased polymerization is promoted, intermediate acidities leading to the production of the lower olefines while high acidities cause the formation of higher polymers. The optimum acidity for the production of di-isobutylene, for example, is in the range of about 40% to about 55% $H_2SO_4$ on a hydrocarbon free basis. Better yields may be obtained by carrying the polymerization out under pressure than by working at atmospheric pressures. This is presumably because lower acid strengths and higher temperatures can be used since the isobutylene, or like monomers, which would otherwise be liberated, are confined in the system and polymerized.

Example I 30.2 grams of 65% $H_2SO_4$ containing ⅕ gram molecule of $H_2SO_4$, absorbed 0.7 gram molecules of isobutylene, i. e. 3½ mols of isobutylene per molecule of $H_2SO_4$. This solution was diluted with 9.1 grams of water, so that the $H_2SO_4$ concentration was reduced to 50%, and heated in a closed tube for two hours at 100°. This resulted in the formation of 37 grams of polymers (theoretical yield 39.2 grams) viz. 32 grams of di-isobutylene and 5 grams of tri-isobutylene.

Example II

The absorption liquid obtained according to Example I was heated in a closed tube, without dilution, to 100° and maintained at this temperature for two hours. The polymer separated out was fractionated with the following result:

|  | Grams |
|---|---|
| To 110° C | 22 |
| 110°–170° | 4 |
| 170°–180° | 10 |
| Above 180° | Less than 1 |

Thus, in this case, about twice as much of the trimeric product was obtained.

It is to be observed that the present invention has been described in connection with certain preferred embodiments thereof. It is to be understood, however, that the invention is not to be limited to these embodiments, and various modifications may be resorted to as those skilled in the art will readily understand. For instance, in place of sulfuric acid any other equivalent strong mineral acid acting acid such, for example, as phosphoric acid, hydrochloric acid, benzene sulfonic acid, ethyl sulfuric acid, and the like, may be used. Similarly the isobutylene polymers which have been used to illustrate the principles and some specific applications of our invention, will be recognized as merely typical examples of the tertiary base olefine polymers which may be manufactured by this novel method of procedure. The tertiary base olefine or olefines used as starting material for our process may be employed either alone as the substantially pure chemical individuals or mixtures thereof, or, more advantageously, in admixture with other unsaturated hydrocarbons of lesser reactivity and/or with paraffins or other compounds which may be considered inert in the process, as the presence of such diluents facilitates rapid absorption without undesirable, uncontrolled, polymerization and other side reactions. The tertiary base olefine or olefines used may thus conveniently be derived from mineral oils, as petroleum, shale oil, and the like, or from mineral oil products, or natural gas, coal, peat and like carboniferous natural material, as well as from vegetable or animal oils, fats or waxes. The olefines present in such starting material may be of natural occurrence, the result of catalytic dehydrogenation, vapor or liquid phase cracking, or other pyrogenetic treatment. Furthermore such tertiary-base olefines may comprise hydrocarbon fractions consisting of, or predominating in, hydrocarbons containing the same number of carbon atoms to the molecule or of mixtures of non-isomeric hydrocarbons. Instead of the tertiary base olefines themselves, the corresponding alcohols may be used as starting material.

In the production of polymers of tertiary base olefines, our invention offers many striking advantages over prior methods of procedure. In the first place, the high ratio of tertiary base olefine or olefines to acid present in the absorption product prepared by our novel method, not only results in increased polymer production from a polymerization unit of a given size, but also gives increased yields of polymer per mol. of acid lost in the operations. Furthermore, by varying the free acid concentration in the tertiary base olefine absorption product prior to the polymerization step, the composition of the resulting product may be controlled and the ratio of dimers to higher polymerization products effectively regulated. High acidity tends to favor the formation of trimers and higher boiling products as illustrated by the different results obtained in the above examples as a result of dilution. It is frequently the case, particularly where a preponderance of dimers is desired, that the optimum acid concentration for polymerization does not correspond to the optimum for absorption since high acid concentrations usually tend to promote rapid absorption. Under such circumstances it is highly desirable to carry out the two operations at different acid concentrations. For example, where aqueous sulfuric acid is used, the absorption may advantageously be carried out with about 50% to about 75% acid on a hydrocarbon free basis, and then water may be added to reduce the acid concentration, before or during the polymerization operation. Very low acidity tends to result in reversion to the original tertiary base olefine.

The use of superatmospheric pressure also offers distinct advantages, particularly when operating with the preferred acid liquors of high tertiary base olefine to acid ratios, and also when using acid liquors of lower olefine content. By employing pressures above atmospheric, as in the foregoing examples, decomposition, particularly reversion to the mono-olefine, may be substantially suppressed. This high pressure procedure is especially desirable when absorption products of high tertiary base olefine content are used, as such absorption products have relatively low boiling points and the desired polymerization temperatures cannot be obtained, because of boiling, unless the system is maintained under superatmospheric pressure.

In our process excessively long times of contact between polymer and acid are avoided and consequently undesirable side reactions leading to sulfurous and gummy products are reduced to a minimum.

It is thus evident that our process of producing tertiary base olefine polymers by the absorption of tertiary base olefines, advantageously in the presence of diluents, in mineral acid acting acids of optimum absorption concentration, particularly to form absorption products containing two or about three and one-half or more mols of tertiary base olefine per mol. of dibasic acid and then adjusting the free acid concentration to the optimum for polymerization and rapidly raising the temperature to about 100° C. while maintaining the system under superatmospheric pressure, and holding the absorption product at about that temperature for a period of time sufficient to complete the polymerization, provides a commercially available method for producing a wide variety of valuable products in a highly efficient and economical manner. By this method, furthermore, substantially pure individual polymers or mixtures of predictable and controllable proportions may be readily obtained. Such products are particularly suited for use as starting material for the production of resins, or as intermediates for the preparation of higher alcohols, or other valuable derivatives, and with or without hydrogenation may be used as components or substitutes of motor fuels of high anti-knock value.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories which we have advanced as to the reasons for the advantageous results attained. On the other hand, the invention is to be regarded as limited only by the terms of the accompanying claims, in which it is our intention to claim all novelty inherent therein as broadly as is possible in view of the prior art.

We claim as our invention:

1. A process of producing di- and tri-isobutylene which comprises contacting isobutylene with aqueous sulfuric acid of about 50% to about 75% concentration until at least two mols of isobutylene per mol of sulfuric acid have been taken up by the acid solution, heating the resulting absorption product under superatmospheric pressure to about 100° C., maintaining said absorption product at about the same temperature and pressure until substantial polymerization of the absorbed isobutylene takes place and recovering the resulting di- and tri-isobutylene.

2. A process of producing di- and tri-isobutylene which comprises contacting isobutylene with an aqueous sulfuric acid of about 50% to about 75% concentration until at least two mols of isobutylene per mol of sulfuric acid have been taken up by the acid solution, heating the resulting absorption product to about 100° C., maintaining said absorption product at about the same temperature and pressure until substantial polymerization of the absorbed isobutylene takes place and recovering the resulting di- and tri-isobutylene.

3. A process of producing di- and tri-isobutylene which comprises contacting isobutylene with an aqueous strong polybasic mineral acid of about 50% to about 75% concentration until at least as many mols of isobutylene per mol of said acid have been taken up by the acid solution as corresponds to the basicity of said acid, heating the resulting absorption product under superatmospheric pressure to about 100° C., maintaining said absorption product at about the same temperature and pressure until substantial polymerization of the absorbed isobutylene takes place and recovering the resulting di- and tri-isobutylene.

4. A process of producing di- and tri-isobutylene which comprises contacting isobutylene with an aqueous strong polybasic mineral acid of about 50% to about 75% concentration until at least as many mols of isobutylene per mol of said acid have been taken up by the acid solution as corresponds to the basicity of said acid, heating the resulting absorption product to about 100° C., maintaining said absorption product at about the same temperature until substantial polymerization of the absorbed isobutylene takes place and recovering the resulting di- and tri-isobutylene.

5. A process of producing preponderantly di-isobutylene from isobutylene which comprises contacting isobutylene with an aqueous sulfuric acid of about 50% to about 75% concentration until isobutylene is taken up by the acid solution, adding sufficient water to the resulting absorption product to reduce the sulfuric acid concentration to a value within the range of about 40% to about 55% on a hydrocarbon free basis and heating the diluted mixture under superatmospheric pressure to 80° to 140° C., maintaining said diluted mixture under said temperature and pressure conditions until substantial polymerization of the absorbed isobutylene takes place and recovering the resulting di-isobutylene.

HENDRIK WILLEM HUYSER.
JOHANNES ANDREAS VAN MELSEN.